No. 779,070. PATENTED JAN. 3, 1905.
H. W. CAGLE.
PNEUMATIC TIRE CLAMP.
APPLICATION FILED FEB. 5, 1904.
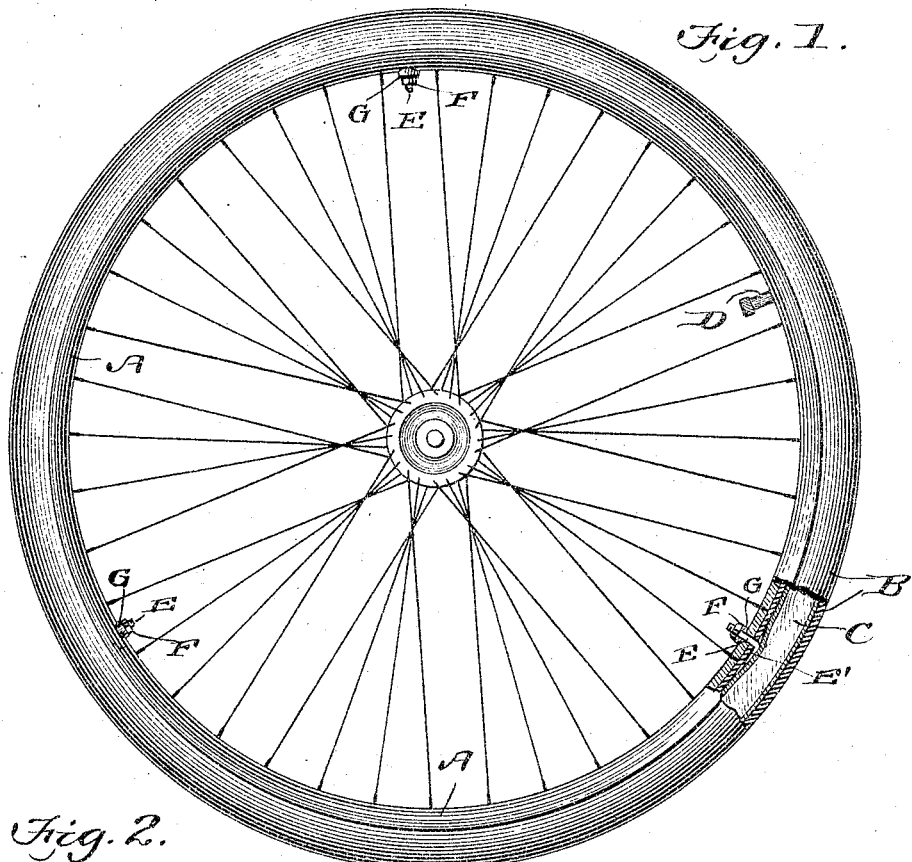
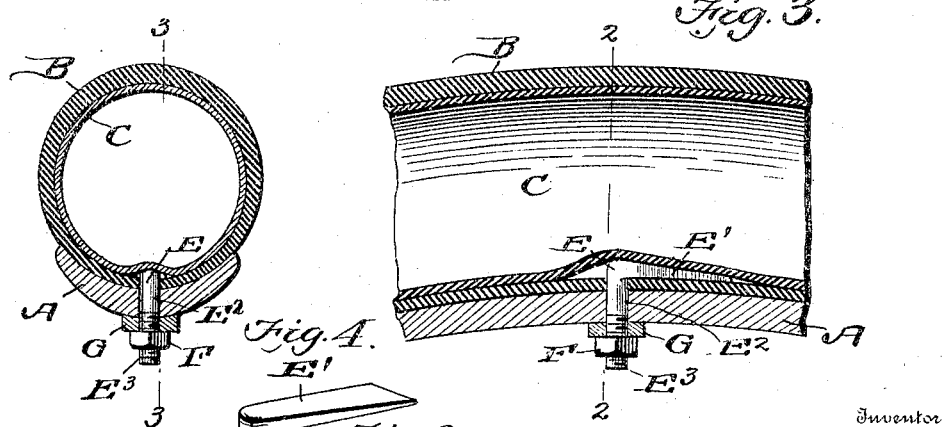

No. 779,070. Patented January 3, 1905.

UNITED STATES PATENT OFFICE.

HOSEA W. CAGLE, OF MARION, ILLINOIS.

PNEUMATIC-TIRE CLAMP.

SPECIFICATION forming part of Letters Patent No. 779,070, dated January 3, 1905.

Application filed February 5, 1904. Serial No. 192,205.

*To all whom it may concern:*

Be it known that I, HOSEA W. CAGLE, a citizen of the United States, residing at Marion, in the county of Williamson and State of Illinois, have invented a new and useful Pneumatic-Tire Clamp, of which the following is a specification.

This invention is a device adapted to be used in connection with pneumatic tires to prevent creeping upon the wheel-rim. Tires are usually connected to the wheel-rim by cement, and the inflating-tube extends through the rim, and in case the tire should creep, as it usually does, the strain is placed mainly upon the inflating-tube, and as a consequence the said tube soon becomes impaired.

The object of my invention, therefore, is to prevent the tire creeping, and this I accomplish by employing one or more angled clamping-bolts in connection with the tire and rim, one member of the bolt clamping the outer tube of the tire to the outer face of the rim, the other member of the bolt passing through the rim and having a nut screwed upon the end thereof to produce the proper clamping pressure.

The invention consists also in certain details of construction hereinafter fully described, and pointed out in the claim.

In the drawings forming a part of this specification, Figure 1 is a side view of a wheel provided with my improvement, a portion of the tire and rim being broken away to show the invention. Fig. 2 is a transverse sectional view on the line 2 2 of Fig. 3, and Fig. 3 is a section on the line 3 3 of Fig. 2. Fig. 4 is a detail perspective view of the clamping-bolt. Fig. 5 is a view of the nut, and Fig. 6 is a view of the washer.

My invention is adapted for use in connection with pneumatic tires for bicycles, carriages, and automobiles, and I have illustrated the same as applied to an ordinary bicycle-wheel, and, referring to the drawings, A indicates the wheel-rim, B the outer tube, and C the inner tube, of the tire, and D the inflating-tube, all of said parts being of the usual construction. E indicates the clamping-bolt, of which I may employ any desired number, and in the present instance I have shown three of them. Each bolt comprises a flat head $E'$, extending in one direction at a right angle to the shank portion $E^2$, the end of said shank being threaded, as shown at $E^3$. The head $E'$ rests between the outer and inner tubes of the tire and presses the outer tubes firmly against the outer face of the tire, the shank $E^2$ passing through an aperture in the outer tube and also through the rim of the wheel, a nut F being firmly screwed upon the threaded end of the bolt, which projects through the rim, and, if desired, a washer G may be interposed between the nut and rim, the outer face of the washer being concaved, as shown at $G'$, in order to snugly fit the inner face of the rim. By tightening the nut upon the shank of the bolt the head thereof is made to clamp the tire firmly, and all danger of the said tire creeping upon the rim is avoided.

Having thus fully described my invention, what I claim as new, and desire to secure by Letters Patent, is—

The combination with the wheel-rim, of the inner and outer tubes arranged upon said rim, the bolt having a flat head extending in one direction only at a right angle from the shank portion of said bolt, said head gradually tapering toward its end, the end of the shank being threaded, a nut adapted to be screwed upon the threaded end of the bolt and a washer having one of its faces concaved and adapted to engage the rim and the other face being flat and adapted to contact with the nut substantially as described.

HOSEA W. CAGLE.

Witnesses:
N. W. FULKE,
ED. M. SPILLER.